(12) United States Patent
Ghannam et al.

(10) Patent No.: US 10,629,081 B2
(45) Date of Patent: Apr. 21, 2020

(54) ACCELEROMETER-BASED EXTERNAL SOUND MONITORING FOR BACKUP ASSISTANCE IN A VEHICLE

(71) Applicant: Ford Global Technologies, LLC, Dearborn, MI (US)

(72) Inventors: Mahmoud Yousef Ghannam, Canton, MI (US); Brian Bennie, Sterling Heights, MI (US); Scott Andrew Amman, Milford, MI (US); Joshua Wheeler, Trenton, MI (US); Doug B. Thornburg, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 15/802,254

(22) Filed: Nov. 2, 2017

(65) Prior Publication Data
US 2019/0130756 A1 May 2, 2019

(51) Int. Cl.
| G08G 1/16 | (2006.01) |
| G10K 15/02 | (2006.01) |
| G10K 11/178 | (2006.01) |
| G10K 15/04 | (2006.01) |
| G01S 15/931 | (2020.01) |

(Continued)

(52) U.S. Cl.
CPC ............ *G08G 1/165* (2013.01); *B60Q 9/008* (2013.01); *G01S 13/931* (2013.01); *G01S 15/931* (2013.01); *G08G 1/166* (2013.01); *G10K 11/17837* (2018.01); *G10K 15/02* (2013.01); *G10K 15/04* (2013.01); *G01S 2013/9317* (2013.01); *G01S 2013/93272* (2020.01);

(Continued)

(58) Field of Classification Search
CPC ........ G08G 1/165; G08G 1/166; G10K 15/04; G10K 11/17837; G10K 15/02; G10K 2210/1282; G01S 13/931; G01S 2013/9378; G01S 2013/9317; B60Q 9/008; H04R 2499/13
See application file for complete search history.

(56) References Cited

U.S. PATENT DOCUMENTS 9,154,893 B1 * 10/2015 Breed ................ H04R 2499/13
9,469,247 B2   10/2016 Juneja et al.
(Continued)

FOREIGN PATENT DOCUMENTS

| DE | 10318294 A1 | 11/2004 |
| FR | 2825882 B1  | 8/2003 |
| JP | 3802897 B2  | 7/2006 |

OTHER PUBLICATIONS

Microsystem Technologies, *Transforming Car Glass Into Microphones Using Piezoelectric Transducers*, Jul. 2016, vol. 22, Issue 7, 4 pages.

*Primary Examiner* — Dale W Hilgendorf
(74) *Attorney, Agent, or Firm* — Frank Lollo; Eversheds Sutherland (US) LLP

(57) ABSTRACT

Accelerometer-based external sound monitoring for backup assistance in a vehicle. The vehicle includes an accelerometer mounted on an internal surface of a rear window of the vehicle, a rear view camera, and a processor. The processor identifies a source of a sound that causes vibrations on the rear window that are captured by the accelerometer. The processor also categorizes the sound and provides an alert based on a category of the sound.

13 Claims, 3 Drawing Sheets

(51) Int. Cl.
*B60Q 9/00* (2006.01)
*G01S 13/931* (2020.01)

(52) U.S. Cl.
CPC *G01S 2015/938* (2013.01); *G10K 2210/1282* (2013.01); *H04R 2499/13* (2013.01)

(56) References Cited

U.S. PATENT DOCUMENTS

| | | | |
|---|---|---|---|
| 2007/0277622 A1* | 12/2007 | Kithil et al. | G01L 1/16 73/775 |
| 2008/0232192 A1* | 9/2008 | Williams | H04R 2201/401 367/8 |
| 2011/0254703 A1* | 10/2011 | Li et al. | G08G 1/166 340/944 |
| 2012/0121103 A1* | 5/2012 | Cohen et al. | H04R 2499/13 381/77 |
| 2014/0328486 A1* | 11/2014 | Gopinath et al. | H04R 2499/13 381/56 |
| 2015/0137998 A1* | 5/2015 | Marti et al. | G10K 15/02 340/901 |
| 2015/0365743 A1 | 12/2015 | Konigsberg et al. | |
| 2016/0355125 A1* | 12/2016 | Herbert | G08G 1/166 |
| 2018/0099646 A1* | 4/2018 | Karandikar et al. | B60W 30/18172 |

\* cited by examiner

US 10,629,081 B2

ACCELEROMETER-BASED EXTERNAL SOUND MONITORING FOR BACKUP ASSISTANCE IN A VEHICLE

TECHNICAL FIELD

The present disclosure generally relates to back up assistance systems in a vehicle and, more specifically, accelerometer-based external sound monitoring for backup assistance in a vehicle.

BACKGROUND

Increasingly, vehicles are being manufactured with rear view cameras and ultrasonic sensors to provide assistance when the vehicle is reversing or about to reverse. Maintaining these systems can be difficult. For example, dirt or snow may block the camera or the ultrasonic sensors. Additionally, especially for the ultrasonic sensors, the angle at which the vehicle is currently traversing may cause objects behind the vehicle to be out of the line of sight and, thus, not detectable.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle includes an accelerometer mounted on an internal surface of a rear window of the vehicle, a rear view camera, and a processor. The processor identifies a source of a sound that causes vibrations on the rear window that are captured by the accelerometer. The processor also categorizes the sound and provides an alert based on a category of the sound.

An examples method to monitor an area behind a vehicle includes measuring signals with an accelerometer mounted on an internal surface of a rear window of the vehicle, the signals caused by sound waves vibrating the rear window. The method also includes identifying a source of a sound waves and categorizing the source. Additionally, the example includes providing an alert based on a category of the source.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
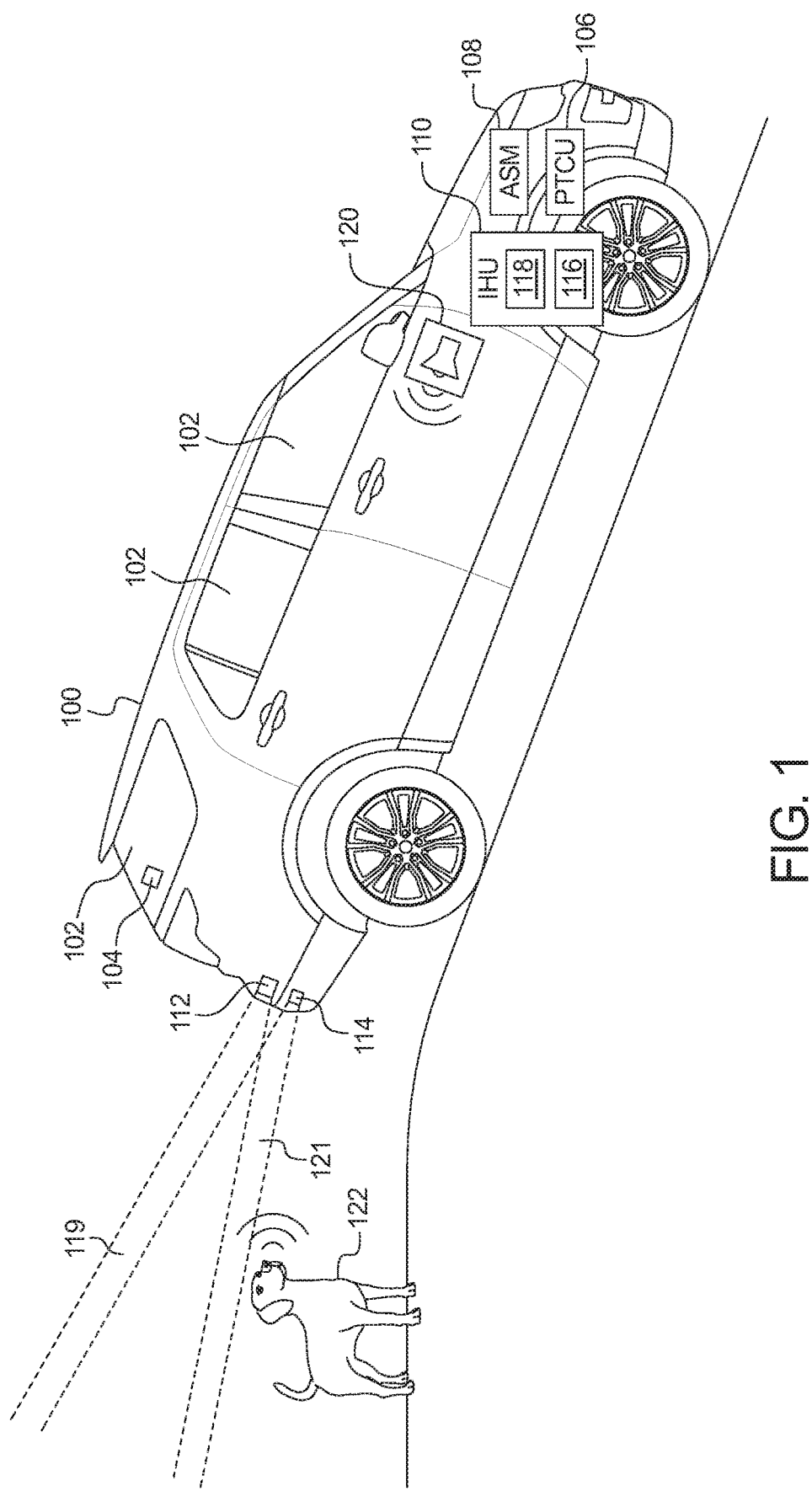
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles with rear view cameras and rear-facing ultrasonic sensors assist drivers detect obstacles behind the vehicle when the vehicle is in reverse. The images captured by the rear view camera are displayed on a display, often built into the center console of the vehicle. Some vehicles include an active safety module that identifies and/or categorizes the objects based on the images captured by the rear-view camera and/or the measurements by the ultrasonic sensors. However, the rear-view camera and ultrasonic sensors may become obscured. For example, dirt may accumulate on the camera or the ultrasonic sensors Additionally, objects behind the vehicle may be out of the line of sight of the rear-view camera and ultrasonic sensors because of obstacles to the side of the roadway obscuring the view (e.g., a hedge, a fence, a wall, etc.) or a change in the angle in the roadway causes the line of sight of the sensors to be angled upwards and thus not capture objects close to the ground (e.g., a bicycle, a pet, etc.).

As described below, a vehicle monitors and categorizes sounds external to the vehicle. However, traditional electric condenser microphones (ECMs) are not constructed for external use. Their delicate microphone diaphragms can be rendered unusable by dirt, snow, rain, or mud. Instead, because sound causes oscillation as it travels through a medium, accelerometers are placed on one or more of the edge of vehicle glass surfaces. This oscillation is measured as a vibration by the accelerometer when the pressure wave impinges on a window of the vehicle. The resulting electrical output from the accelerometer is processed by sound categorizer that categorizes into importance categories (e.g., a critical category and a non-critical category, etc.) and/or identifies the sound. The vehicle provides an alert based on the category and/or identity of the sound. For example, sounds indicative of human speech may be categorized as critical while sound indicative of average traffic noise may be categorized as non-critical. The accelerometers are mounted on one or more of the windows to the rear of the vehicle (e.g., the back glass, the left backseat door glass, the right backseat door glass, etc.). Additionally, in some examples, the sound categorizer operates in one of two modes. In a first mode (sometimes referred to as a "passive mode"), the sound categorizer causes a captured sound to play on a sound system of the vehicle when the sound is categorized as critical. In a second mode (sometimes referred to as an "active mode"), the sound categorizer causes a captured sound to play on a sound system of the vehicle regardless of the categorization of the sound.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc.

The vehicle 100 may be non-autonomous or semi-autonomous (e.g., some routine motive functions controlled by the vehicle 100). Alternatively, in some examples, the vehicle 100 may be an autonomous vehicle (e.g., routine motive functions controlled by the vehicle 100). In the illustrated example the vehicle 100 includes windows 102, one or more accelerometers 104, a powertrain control unit (PCU) 106, an active safety module (ASM) 108, and an infotainment head unit 110.

The windows 102 include a windshield, a back glass, a left front door glass, a left backseat door glass, a right front door glass, a right backseat door glass, and/or a moon roof. Some of the windows 102 are made of laminated glass (sometimes referred to as "safety glass") (e.g., the windshield, etc.) and some of the windows 102 are made of non-laminated tempered glass (e.g., the left front door glass, the left backseat door glass, the right front door glass, the right backseat door glass, etc.). The glass of the windows 102 vibrates when struck by sound waves.

The accelerometer(s) 104 may be any type of accelerometer that (a) measures the vibrations perpendicular to the plane of glass of the corresponding window 102 and (b) measures a wide frequency range (e.g., the frequency range of audible sound, etc.), including uniaxial or triaxial accelerometers, micromachined or piezoelectric accelerometers, etc. The accelerometer(s) 104 is/are rigidly mounted on one or more of the windows 102 on the interior of the cabin of the vehicle 100. In the illustrated example, the accelerometers 104 is mounted on the back glass window. In some examples, to improve the arc behind the vehicle 100 in which the noise from obstacles is detected, the accelerometers 104 are installed on other windows 102, such as the left backseat door glass and/or the right backseat door glass.

The powertrain control unit 106 includes hardware and firmware to control the ignition, fuel injection, emission systems, transmission and/or the brake system of the vehicle 100. The powertrain control unit 106 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. Additionally, the powertrain control unit 106 communicates statuses of the vehicle 100 relating to the powertrain (e.g., the status of the ignition, the status of the transmission, the speed of the vehicle 100, etc.) onto a vehicle data bus (e.g., the vehicle data bus 202 of FIG. 2 below).

The active safety module 108 includes hardware and software to detect and identify objects proximate the vehicle 100 based on images captured by one or more cameras (e.g., a rear view camera 112, etc.) and/or range detection sensors (e.g., the ultrasonic sensors 114, etc.) using image recognition and spatial recognition techniques. The active safety module 108 categorizes the objects and, in some examples, requests a warning be provided to the driver based on the category of the detected object. The detection and identification of obstacles is use in various functions of the active safety module 108, such as traffic sign recognition and/or collision avoidance, etc.

The infotainment head unit 110 provides an interface between the vehicle 100 and a user. The infotainment head unit 110 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 110 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 110 displays the infotainment system on, for example, the center console display.

In the illustrated example, the infotainment head unit 110 includes database of sound signatures 116 and an obstacle monitor 118 to detect sounds and identify of objects behind the vehicle 100 and provides an audio, visual, and/or haptic warning to a driver when (a) the rear view camera 112 and/or the rear-facing ultrasonic sensors 114 are obscured or malfunctioning, and/or (b) the vehicle 100 is positioned such that the field of view 119 of the rear view camera 112 and/or the field of view 121 of the rear-facing ultrasonic sensors 114 cannot observe the area behind the vehicle 100 (e.g., the vehicle 100 is positioned on a hill, etc.). The obstacle monitor 118 processes signals produced by the accelerometer(s) 104 that are caused by sounds waves contacting the corresponding window(s) 102. The obstacle monitor 118 compares the detected sound to signatures in the database of sound signatures 116 and categorizes the sound. Based on the category, the obstacle monitor 118 provides an audio, visual, and/or haptic alert. For example, the obstacle monitor 118 may cause the sound system of the infotainment head unit 110 to emit a chime and a steering wheel control module to vibrate the steering wheel. Additionally, in some examples, depending on a mode selected by a user, the obstacle monitor 118 plays the sound over speakers 120 of the vehicle 100.

The database of sound signatures 116 contains signatures to be compared to the signals from the accelerometer 104 that are processed by the obstacle monitor 118. As used herein, a signature is an identifiable segment of a signal in the time domain or the frequency domain that is associated with a source of sound. For example, a signature may associate a signal in the frequency domain to the sound indicative of human speech or an animal's cry. The database of sound signatures 116 may be any suitable data structure that associates a time or frequency domain representation of a sound to an event, phenomenon, and/or source of the sound. The database of sound signatures 116 associates each signature with a category and an identifier. In some examples, the database of sound signatures 116 associates each signature with a natural language identifier (e.g., "cat," "traffic noise," etc.) and/or a sound file of the nature language identifier to be played on the speakers 120.

The obstacle monitor 118 determines whether the rear-view camera 112 and/or the rear-facing ultrasonic sensors 114 are obscured or malfunctioning (e.g., not providing data/images, etc.). In some examples, to determine whether the rear-view camera 112 is obscured (e.g., by snow or mud, etc.), the obstacle monitor 118 analyzes the average light intensity of the pixels of the images captured by the rear-view camera 112. For example, the rear-view camera 112 is likely obscured when the average light intensity of the pixels is low. Alternatively or additionally, in some examples, to determine whether the rear-view camera 112 is obscured, the obstacle monitor 118 analyzes the light intensity of the pixels of the images captured by the rear-view camera 112 to determine whether a majority of the pixels have a substantially similar (e.g.,) pixel intensity.

The obstacle monitor 118 filters and processes, in the time and frequency domains, the signals caused by sound waves interacting with the window(s) 102. The obstacle monitor 118 compares the processed signal to the signatures in the database of sound signatures 116 to identify the source of the signal and categorized the source of sound into categories of importance. For example, the obstacle monitor may categorizes a sound as critical or non-critical. A critical sound is a sound that originates from an object 122 that has a high likelihood of being behind the vehicle 100 or soon to be behind the vehicle 100. For example, critical sounds may includes human sounds, animals sounds, horns (e.g., car horns, etc.) and/or bells (e.g., bicycle bells, etc.), etc. Non-critical sounds are sounds that are likely ambient or environmental sounds, such as music, traffic noise, rain, etc. In some examples, obstacle monitor 118 adjusts the category of the sound based on the intensity (e.g., in decibel-milliwatts (dBm)) of the sound as detected by the accelerometer 104. For example, a sound that is associated with an object categorized as critical may be categorizes as non-critical if the intensity of the sound is less that a threshold. In such a manner, the obstacle monitor 118 distinguishes between objects 122 that are near the rear of the vehicle 100 and objects 122 that are close to the vehicle.

When the rear-view camera 112 and/or the rear-facing ultrasonic sensors 114 are not obscured, identities of objects 122 behind the vehicle 100 generated by the active safety module 108 are prioritized. That is, when the active safety module 108 identifies an object 122 in the critical category, the obstacle monitor 118 provides an audio, visual, and/or haptic alert associated with identity of the object 122 determined by the active safety module 108. However, even then the identities of objects 122 behind the vehicle 100 generated by the active safety module 108 are prioritized, the obstacle monitor 118 still independently attempts to identify the source (e.g., the object 122) of the sound. In an example scenario (e.g., as illustrated in FIG. 1), the vehicle 100 may be positioned on a hill such that the object 122 generating sound is outside the fields of view 119 and 121 of the rear-view camera 112 and the ultrasonic sensors 114. In such an example scenario, the obstacle monitor 118 may provide an identity of the object 122 even when the non-obscured rear-view camera 112 and ultrasonic sensors 114 cannot observe the object 122.

When the rear-view camera 112 and/or the rear-facing ultrasonic sensors 114 are obscured, the obstacle monitor 118 provides the identity of the sound to the active safety module 108. Additionally, when the obstacle monitor 118 identifies the object 122 based on the sound detected by the accelerometer 104 that is in the critical category, the obstacle monitor 118 provides an audio, visual, and/or haptic alert associated in the database of sound signatures 116 with identity of the object 122. In some examples, the alert includes the natural language identifier associated with the detected object 122. For example, the obstacle monitor 118 may cause "Warning. A dog may be behind the vehicle" to play on the speakers 120 of the vehicle 100 when the obstacle monitor 118 determines that the object 122 is a dog. In some examples, the when the sound is categorized as critical, the obstacle monitor 118 instructs the powertrain control unit 106 to apply the brakes of the vehicle 100 to stop the motion of the vehicle 100 in reverse. That is, the obstacle monitor 118 causes the vehicle 100 to autonomously brake and ignore input of an acceleration pedal.

In some examples, the obstacle monitor 118 operates in different modes in which it reacts differently to the detected objects based on the category assigned to the object 122. In some such examples, the obstacle monitor 118 operates in a "passive mode" and in an "active mode." In the passive mode, the obstacle monitor 118 provides the alert and plays the sound detected by the accelerometer 104 on the speakers 120 when the object 122 is categorized as critical. When the obstacle monitor 118 operates in the active mode, the obstacle monitor 118 plays the sound detected by the accelerometer 104 on the speakers 120 regardless of the category associated with the object 122. In some examples, the obstacle monitor 118 operates in a "stationary mode" in which the obstacle monitor 118 provides the alert and plays the sound detected by the accelerometer 104 on the speakers 120 when the vehicle 100 is stationary with the transmission in park. In such a manner, the obstacle monitor 118 provides alerts when, for example, the rear-view camera (and thus the back glass) is obscured by severe weather conditions (e.g., snow, etc.) and provides information for the occupants of the vehicle 100 to exit the vehicle 100.

In some examples, when the vehicle 100 is an autonomous vehicle, the obstacle monitor 118 augment other autonomous functions of the vehicle 100. For example, when one or more rear-facing sensors of the vehicle 100 are obscured, the autonomous vehicle may use the identified sounds as a source of information to facilitate parking in an emergency area. Additionally, in such examples, the vehicle 100 may provide information to the occupants of the vehicle 100 to exit the vehicle 100.

Figure 2:
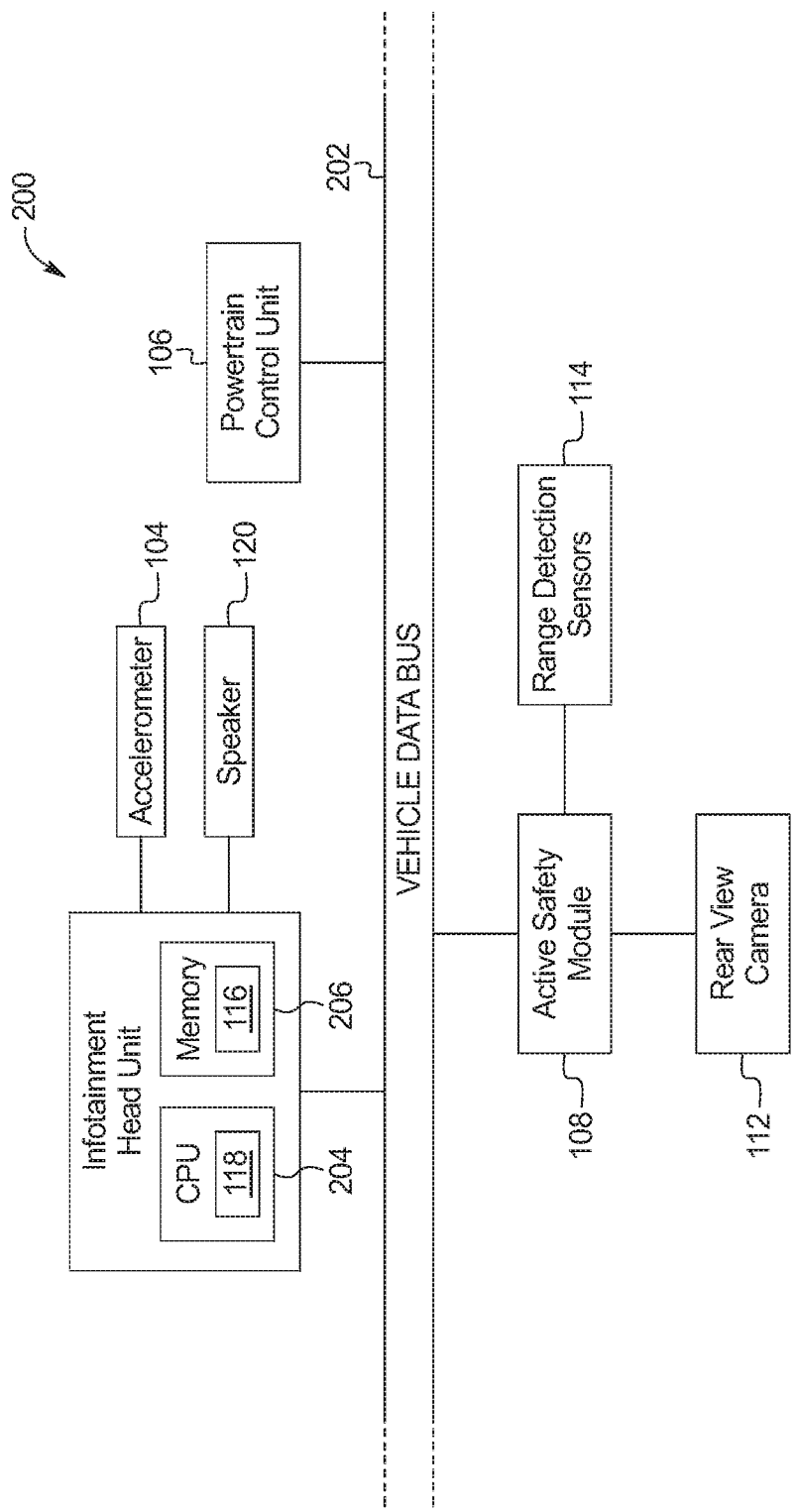
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the accelerometer(s) 104, the powertrain control unit 106, the active safety module 108, the infotainment head unit 110, the rear view camera 112, the ultrasonic sensors 114, the speakers 120, and a vehicle data bus 202.

The infotainment head unit 110 includes a processor or controller 204 and memory 206. In the illustrated example, the infotainment head unit 110 is structured to include obstacle monitor 118. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory. In the illustrated example, the memory 206 includes the database of sound signatures 116.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the powertrain control unit 106, the active safety module 108, and the infotainment head unit 110. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
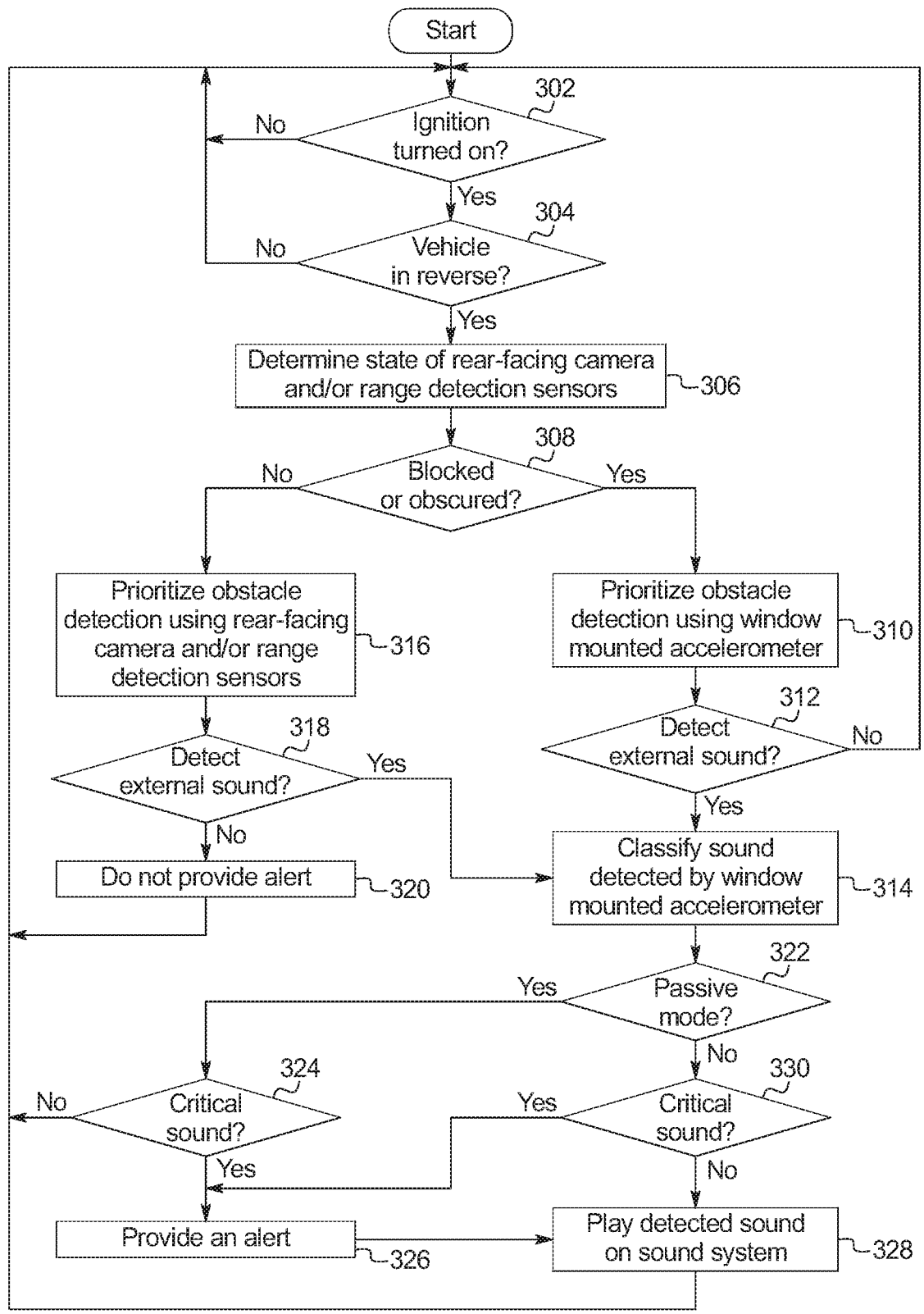
FIG. 3 is a flowchart of a method to provide backup assistance with an accelerometer mounts on back glass of the vehicle of FIG. 1, which may be implemented by the electronic components of FIG. 2.

FIG. 3 is a flowchart of a method to provide backup assistance with an accelerometer 104 mounted on back glass of the vehicle 100 of FIG. 1, which may be implemented by the electronic components 200 of FIG. 2. Initially, at block 302, the obstacle monitor 118 waits until the ignition of the vehicle 100 is on. At block 304, the obstacle monitor 118 waits until the transmission of the vehicle 100 in reverse. At block 306, the obstacle monitor 118 determines the state (e.g., obscured, not obscured, etc.) of the rear-view camera 112 and/or the ultrasonic sensors 114. In some examples, the obstacle monitor 118 analyzes the data captured by the rear-view camera 112 and/or the ultrasonic sensors 114 to determine whether the data is indicative of the rear-view camera 112 and/or the ultrasonic sensors 114 being obscured. For example, the obstacle monitor 118 may perform a pixel analysis on the images captured by the rear-view camera 112 to determine whether the light levels in the images are indicative of the rear-view camera 112 being obscured by snow. At block 308, the obstacle monitor 118 determines wither the rear-view camera 112 and/or the ultrasonic sensors 114 is obscured or blocked. When the rear-view camera 112 and/or the ultrasonic sensors 114 is obscured of blocked, the method continues at block 310. Otherwise, when the rear-view camera 112 and/or the ultrasonic sensors 114 is not obscured or blocked, the method continue at block 316.

At block 310, the obstacle monitor 118 prioritizes the obstacle detection based on the sounds detected by the accelerometer 104 mounted on the back glass of the vehicle 100. At block 312, the obstacle monitor 118 determines whether the accelerometer 104 detects a sound. When the accelerometer 104 detects a sound, the method continues at block 314. Otherwise, when the accelerometer 104 does not detect a sound, the method returns to block 302. At block 314, the obstacle monitor 118 classifies the sound detected by the accelerometer and assigns the sound a category. In some examples, the obstacle monitor 118 filters and processes (e.g., in the time domain, in the frequency domain) the sound and compares it to signatures in the database of sound signatures 116.

At block 316, the obstacle monitor 118 prioritizes the obstacle detection based on analysis by the active safety module 108. At block 318, the obstacle monitor 118 determines whether the accelerometer 104 detects a sound. When the accelerometer 104 detects a sound, the method continues at block 314. Otherwise, when the accelerometer 104 does not detect a sound, the method continues at block 320. At block 320, the obstacle monitor 118 does not provide an alert.

At block 322, the obstacle monitor 118 determines whether it is in the passive mode. When the obstacle monitor 118 is in the passive move, the method continues at block 324. Otherwise, when the obstacle monitor 118 is in the active mode, the method continues at block 330. At block 324, the obstacle monitor 118 determines whether the sound was categorized as critical at block 314. When the sound was categorized as critical, the method continues at block 326. Otherwise, when the sound was not categorized as critical, the method returns to block 302. At block 326, the obstacle monitor 118 provides an audio, visual, and/or haptic alert to the driver. At block 328, the obstacle monitor 118 plays the sound through the speakers 120 of the sound system. At block 330, the obstacle monitor 118 determines whether the sound was categorized as critical at block 314. When the sound was categorized as critical, the method continues at block 326 to provide an audio, visual, and/or haptic alert to the driver. Otherwise, when the sound was not categorized as critical, the method continues at block 328 to play the sound through the speakers 120 of the sound system.

The flowchart of FIG. 3 is representative of machine readable instructions stored in memory (such as the memory 206 of FIG. 2) that comprise one or more programs that, when executed by a processor (such as the processor 204 of FIG. 2), cause the infotainment head unit 110 to implement the example obstacle monitor 118 of FIGS. 1 and 2. Further, although the example program(s) is/are described with reference to the flowchart illustrated in FIG. 3, many other methods of implementing the example obstacle monitor 118 may alternatively be used. For example, the order of execution of the blocks may be changed, and/or some of the blocks described may be changed, eliminated, or combined.

An example vehicle includes an accelerometer mounted on an internal surface of a rear window of the vehicle, a rear view camera, and a processor. The processor identifies a source of a sound that causes vibrations on the rear window that are captured by the accelerometer. The processor also categorizes the sound and provides an alert based on a category of the sound.

In some examples, the processor determines whether the rear view camera is obscured, and when the rear view camera is obscure, provides the identity of the source to other vehicle subsystems. In some such examples, to determine whether the rear view camera is obscured, the processor performs a pixel level analysis of light intensities of images captured by the rear view camera. In some examples, memory stores a database of sound signatures. To identify the source of the sound, the processor processes the sound to generate an observed signature; and compares the observed signature to signatures stored in the database of sound signatures. In some examples, the processor categorizes the sound as either a first category or a second category. In some such examples, the processor provides the alert when the sound is assigned to the first category and does not provide the alert when the sound is assigned to the second category. In some such examples, the processor determines a mode of operation of the vehicle. In some such examples, when the vehicle is operating in a first mode, the processor plays the sound through speakers of the vehicle when the sound is categorized in the first category. In some such examples, when the vehicle is operating is a second mode, the processor plays the sound through the speakers of the vehicle regardless of how the sound is categorized.

An examples method to monitor an area behind a vehicle includes measuring signals with an accelerometer mounted on an internal surface of a rear window of the vehicle, the signals caused by sound waves vibrating the rear window. The method also includes identifying a source of a sound waves and categorizing the source. Additionally, the example includes providing an alert based on a category of the source.

In some example, to determine whether the rear view camera is obscured, the method includes performing a pixel level analysis of light intensities of images captured by the rear view camera. In some examples, to identify and categorize the source, the method includes processing the signals measured by the accelerometer to generate an observed signature and comparing the observed signature to signatures stored in the database of sound signatures. IN some examples, the method includes providing the alert when the sound is assigned to a first category and not providing the alert when the sound is assigned to a second category. In some examples, the method includes (a) when the vehicle is operating in a first mode, playing the sound waves through speakers of the vehicle when the sound is categorized in a first category, and (b) when the vehicle is operating in a second mode, playing the sound through the speakers of the vehicle regardless of how the sound is categorized.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an accelerometer mounted on an internal surface of a rear window of the vehicle;
a rear view camera; and
a processor to:
identify a source of a sound that causes vibrations on the rear window that are captured by the accelerometer;
categorize the sound;
provide an alert based on a category of the sound;
determine whether the rear view camera is obscured; and
when the rear view camera is obscured, provide an identity of the source to other vehicle subsystems.

2. The vehicle of claim 1, wherein to determine whether the rear view camera is obscured, the processor is to perform a pixel level analysis of light intensities of images captured by the rear view camera.

3. The vehicle of claim 1, including memory storing a database of sound signatures, and wherein to identify the source of the sound, the processor is to:
process the sound to generate an observed signature; and
compare the observed signature to signatures stored in the database of sound signatures.

4. The vehicle of claim 1, wherein the processor is to categorize the sound as either a first category or a second category.

5. The vehicle of claim 4, wherein the processor is to provide the alert when the sound is assigned to the first category and not provide the alert when the sound is assigned to the second category.

6. The vehicle of claim 4, wherein the processor is to determine a mode of operation of the vehicle.

7. The vehicle of claim 6, wherein when the vehicle is operating in a first mode, the processor is to play the sound through speakers of the vehicle when the sound is categorized in the first category.

8. The vehicle of claim 7, wherein when the vehicle is operating is a second mode, the processor is to play the sound through the speakers of the vehicle regardless of how the sound is categorized.

9. A method to monitor an area behind a vehicle, the method comprising:
measuring signals with an accelerometer mounted on an internal surface of a rear window of the vehicle, the signals caused by sound waves vibrating the rear window;
identifying, with a processor coupled to memory containing a database of sound signatures, a source of the sound waves; categorizing the source;
providing an alert based on a category of the source;
when the vehicle is operating in a first mode, playing the sound waves through speakers of the vehicle when the sound waves are categorized in a first category; and
when the vehicle is operating in a second mode, playing the sound waves through the speakers of the vehicle regardless of how the sound waves are categorized.

10. The method of claim 9, including:
determining whether a rear view camera is obscured; and
when the rear view camera is obscured, providing an identity of the source to other vehicle subsystems.

11. The method of claim 10, wherein determining whether the rear view camera is obscured includes performing a pixel level analysis of light intensities of images captured by the rear view camera.

12. The method of claim 9, wherein identifying and categorizing the source includes:
processing the signals measured by the accelerometer to generate an observed signature; and
comparing the observed signature to signatures stored in the database of sound signatures.

13. The method of claim 9, including providing the alert when the sound waves are assigned to a first category and not providing the alert when the sound waves are assigned to a second category.

* * * * *